US008516179B2

(12) United States Patent
Hinrichs

(10) Patent No.: US 8,516,179 B2
(45) Date of Patent: Aug. 20, 2013

(54) INTEGRATED CIRCUIT WITH COUPLED PROCESSING CORES

(75) Inventor: Joel Henry Hinrichs, Colorado Springs, CO (US)

(73) Assignee: Digital RNA, LLC, Wilmington, DE (US)

( * ) Notice: Subject to any disclaimer, the term of this patent is extended or adjusted under 35 U.S.C. 154(b) by 1912 days.

(21) Appl. No.: 10/999,677

(22) Filed: Nov. 30, 2004

(65) Prior Publication Data

US 2005/0149776 A1 Jul. 7, 2005

Related U.S. Application Data

(60) Provisional application No. 60/526,696, filed on Dec. 3, 2003.

(51) Int. Cl.
G06F 13/00 (2006.01)

(52) U.S. Cl.
USPC ............... 710/317; 712/11; 712/10; 711/148

(58) Field of Classification Search
USPC .................. 711/104, 148; 710/317; 712/10, 712/11
See application file for complete search history.

(56) References Cited

U.S. PATENT DOCUMENTS

| | | | | |
|---|---|---|---|---|
| 5,127,067 A | * | 6/1992 | Delcoco et al. | 385/24 |
| 5,701,507 A | * | 12/1997 | Bonneau et al. | 716/8 |
| 5,717,943 A | * | 2/1998 | Barker et al. | 712/20 |
| 6,067,633 A | * | 5/2000 | Robbins et al. | 714/1 |
| 6,219,627 B1 | * | 4/2001 | Bonneau et al. | 703/1 |
| 6,295,598 B1 | * | 9/2001 | Bertoni et al. | 712/28 |
| 6,378,029 B1 | * | 4/2002 | Venkitakrishnan et al. | 710/317 |
| 6,449,170 B1 | * | 9/2002 | Nguyen et al. | 361/778 |
| 6,553,447 B1 | * | 4/2003 | Arimilli et al. | 710/316 |
| 6,684,280 B2 | * | 1/2004 | Chauvel et al. | 710/244 |
| 7,155,637 B2 | * | 12/2006 | Jarboe et al. | 714/8 |
| 2003/0091040 A1 | * | 5/2003 | Furukawa | 370/375 |
| 2003/0097518 A1 | * | 5/2003 | Kohn et al. | 711/5 |
| 2003/0140263 A1 | * | 7/2003 | Arends et al. | 713/320 |
| 2004/0098561 A1 | * | 5/2004 | Galles et al. | 712/14 |

OTHER PUBLICATIONS

"Microsoft Computer Dictionary:" 2002, Microsoft Press. 5$^{th}$ edition. p. 488.*
Michael R. Betker, Mulitple Processors vie for Tight Space, EETimes, Mar. 21, 2000.
Crista Sousa, Tensilica aimsXternsa V Core at Linking CPUs in Single Design, Electronics Supply&Manufacturing, Aug. 30, 2002.
The FreeDictionary.Com by Favlex, INMOS Transputer.

* cited by examiner

Primary Examiner — Hong Kim
(74) Attorney, Agent, or Firm — Wolff & Samson PC

(57) ABSTRACT

A processing system on an integrated circuit includes a group of processing cores. A group of dedicated random access memories are severally coupled to one of the group of processing cores or shared among the group. A star bus couples the group of processing cores and random access memories. Additional layer(s) of star bus may couple many such clusters to each other and to an off-chip environment.

23 Claims, 6 Drawing Sheets

INTEGRATED CIRCUIT WITH COUPLED PROCESSING CORES

RELATED APPLICATIONS

The present invention claims priority on provisional patent application Ser. No. 60/526,696, filed on Dec. 3, 2003, entitled "CPU," which application is now expired.

FIELD OF THE INVENTION

The present invention relates generally to the field of integrated circuits and more particularly to a processing system on an integrated circuit.

BACKGROUND OF THE INVENTION

Integrated circuit Central Processing Unit (CPU) architecture has passed a point of diminishing returns. CPUs require greater and greater die surface area for linear increases in clock speed and not necessarily corresponding increases in processed instructions. Present CPUs provide one to three billion instructions per second (1 to 3 GIPS) best case, yet under typical operating conditions these CPUs achieve at most 10% to 20% of their theoretical maximum performance.

Thus there exists a need for a CPU architecture that requires less die surface area and provides a greater theoretical maximum performance and greater performance under typical operating conditions.

SUMMARY OF THE INVENTION

A processing system on an integrated circuit that solves these and other problems has a number of processing cores coupled together. A number of random access memories are each dedicated to one of the processing cores. A first group of the processing cores are coupled together by a first star bus. A second group of the processing cores may be coupled together by a second star bus and coupled to the first group of processing cores by a third star bus. One or more shared random access memories may be coupled to the first star bus. The first star bus may be a unidirectional bus. One of the cores is disabled when it tests defective. Additional shared random access memory or memories may be coupled to the second star bus.

In one embodiment, a processing system on an integrated circuit includes a group of processing cores. A group of dedicated random access memories are each directly coupled to one of the group of processing cores. A star bus couples the group of processing cores. A shared random access memory may be coupled to the star bus. The shared random access memory may consist of multiple independent parts which are interleaved. A second group of processing cores may be coupled together by a second star bus. The second group of processing cores may be coupled to the first group of processing cores by a third star bus. Each of the group of processing cores may have an isolation system. The star bus may be a unidirectional bus.

In one embodiment, a processing system on an integrated circuit includes a group of processing cores. A star bus couples the group of processing cores together. A group of dedicated random access memories may each be directly coupled one of the group of processing cores. A number of similar groups of processing cores and random access memories, all joined by star buses, may be coupled to the first group of processing cores by a second level of star bus. A shared group of random access memories may be coupled to the second level star bus. The shared random access memories may be interleaved. Each of the group of processing cores may be fusable. Some of the shared random access memories may be fusable.

DETAILED DESCRIPTION OF THE DRAWINGS

The present invention overcomes the limitations present CPU (central processing unit) architectures by having a number or simple processing cores coupled together with small dedicated RAMs (Random Access Memory). This increases the efficiency in the use of die space, since a number of simple cores require significantly less die space for the same theoretical computation power. The use of dedicated local RAM also increases the real computation power of the cluster of processing cores, since the memory access speed is significantly increased. First the memory speed is increased by virtue of the large number of independent RAMs present; and second the memory speed is increased by virtue of the much wider word size available on a die because there is no pin limitation; and third the memory speed is increased by virtue of the fact that very small RAMs have smaller physical distances to traverse hence are inherently faster; and fourth the memory speed is increased by virtue of the fact that there are no chip-to-chip line drivers and no lengthy chip-to-chip signal paths to traverse.

Figure 1:
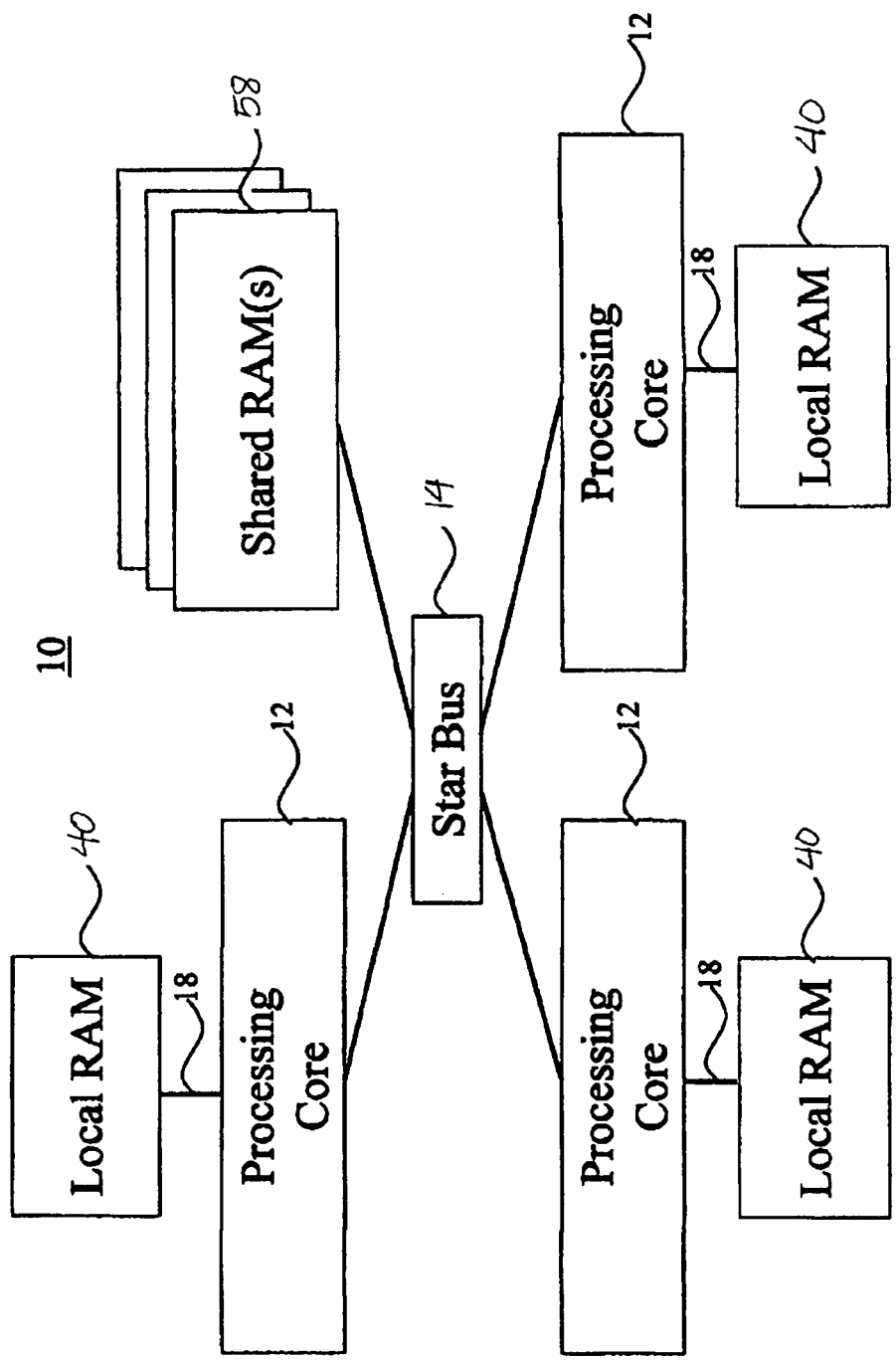
FIG. 1 is a partial block diagram of a processing system having a single core on an integrated circuit in accordance with one embodiment of the invention.

FIG. 1 is a block diagram of a processing system 10 on an integrated circuit in accordance with one embodiment of the invention. The processing system 10 has a number of processing cores 12. Commonly, each of the processing cores 12 is exactly the same. The processing cores 12 are coupled together usually by a star bus 14. For each processing core 12 there is a dedicated RAM 40 coupled to the processing core 12 by a dedicated bus 18. In another embodiment, many but not all processing cores 12 have dedicated RAMs 40. The processing cores 12 also have access to one or more shared RAMs 20 through the star bus 14.

Figure 2:
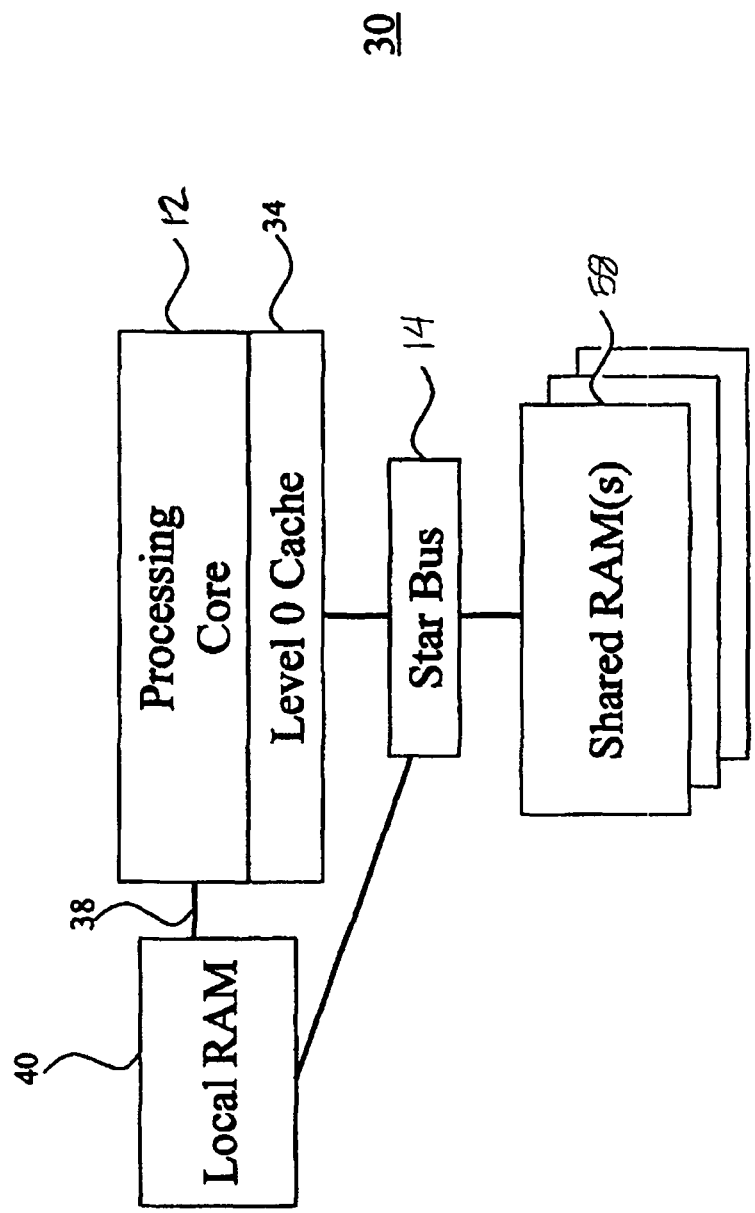
FIG. 2 is a partial block diagram of a processing system for a switch consisting of a single core on an integrated circuit in accordance with one embodiment of the invention.

FIG. 2 is a partial block diagram of a processing system 30 on an integrated circuit in accordance with one embodiment of the invention. The processing system has a processing core 12. The processing core 12 has a level zero cache 34 and is coupled to a common access port 14. The processing core 12 is also coupled through a dedicated bus 38 to a local RAM (Random Access Memory) 40. The common access port 14 is coupled to the local RAM 40 and to a shared RAM 58.

Note that the processing core 12 may be simple cores that are generally limited only to those elements which have an immediate practical value. The processing core's 12 instruction set is generally mapped onto the specific set of machine instructions utilized by C or C++ compilers. This is because computer code that is not written in direct machine language is usually written in C or C++ language. Higher level application languages tend to be embodied in computer code written in C or C++. As a result, this allows the cores 12 to handle most computer programs. The cores may generally not be pipelined and not have specialty instructions for enhancing graphics, text editing or other user-interface matters. In one embodiment, the processing cores are thirty-two bit, single address, CISC cores. These cores may only require 50,000 to 75,000 logic gates.

The level zero cache is generally very small. It may be as little as one-quarter to one-half kilobytes of live code and data storage.

The use of local on chip RAM provides access to data required by the processing cores in far less than the sixty to one hundred nanosecond times for external RAM. This significant reduction in access time is due to the short signal paths that the data travels and due to the fact that the local RAM is very small compared to most external RAMs and finally due to the fact that there is a smaller probability of contention for the signal paths the data travels over. Note that small at the time of this application means that a RAM may be between 128 KBytes and 512 KBytes.

Figure 3:
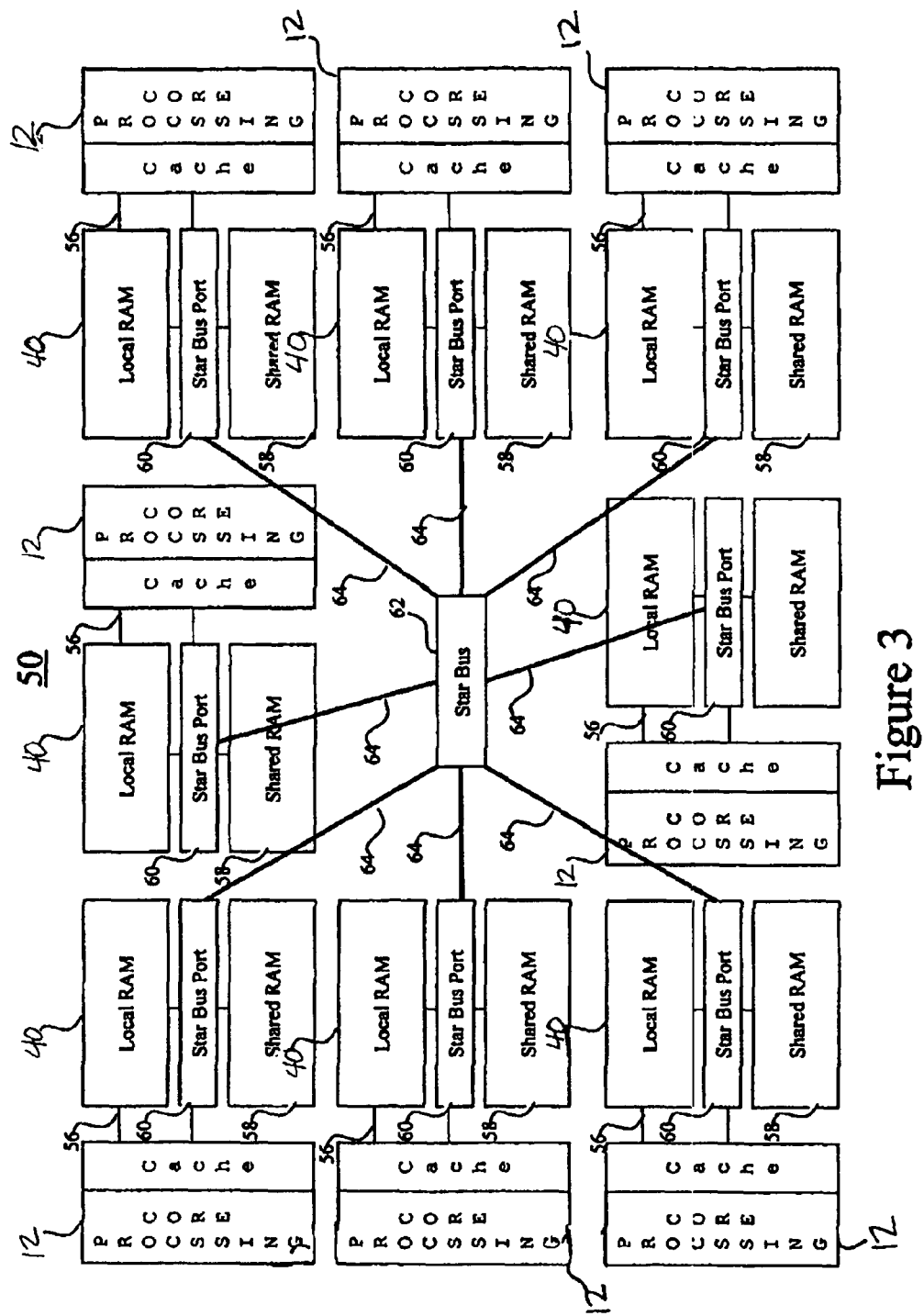
FIG. 3 is a block diagram of a processing system having multiple cores on an integrated circuit in accordance with one embodiment of the invention.

FIG. 3 is a block diagram of a processing system 50 on an integrated circuit in accordance with one embodiment of the invention. This figure shows how a number of processing cores 12 are coupled together in one embodiment. Each of the processing cores 12 is coupled to a dedicated RAM 40 by a dedicated bus 56. Associated with each processing core 12 is shared RAM 58 that is accessed through a common access point 60. Each of the common access points 60 are coupled to a group common access point 62. The group common access point 62 form a star bus that allows each of the processing cores 12 to directly communicate with each other or the shared RAMs 58. A common access point is a small bus controller that receives a request for access and then provides a path between the sender and receiver. Normally, the bus will not use tri-stating. This saves gates and die space and is not necessary because of the short signal paths. In one embodiment, the common access point or star bus is set up to be a unidirectional bus. This means that common access point only allows the bus to be tied up for one bus event. It does not literally mean that the bus only transports data in one direction. As a result, a write operation passes data in a single bus event while a read operation passes the request in one bus event, and later the data returns in a second bus event; a read therefore requires two bus events. A request for data from one of the processing cores 12 to one of the shared RAMs 58 may first query that the bus 40 is available and receive an acknowledgement. The processing core would then send the read request. The bus then would be made available for other traffic. The RAM may respond during that bus event with a "not ready" signal, in which case the core 12 repeats the process of acquiring the bus and signaling RAM 58. When the RAM was ready to transmit the requested data, it also would first request access to the bus, then use the bus to return data to the core 12. This "unilateral" function of the bus allows efficient use of the bus, so that it is not tied up just waiting for a response to an instruction.

In one embodiment, the shared RAMs 58 have interleaved addresses. Interleaving is a method whereby some less-significant address bits select one of the RAMs 58, and the remaining bits address data within the RAM 58. The result is that a sequence of neighboring words will tend to come from each RAM 40, 58 in sequence. This enhances the likelihood that the processing cores 12 will fall into a pattern of using the RAMs 58 sequentially. In addition, this will allow the processing cores 12 to keep many of the RAMs 40, 58 busy simultaneously.

In one embodiment, the bus 40 and the other buses have wide signal paths and the RAMs have large word widths. For instance, the RAMs may have a word width of 32 bytes. This allows a full 32 byte word to be written beginning at any byte boundary. In addition, any byte, word, double word etc. in the 32 byte word may be written without disturbing the contents of any other parts of the 32 byte RAM word. It also allows any single bit or field of bits to be accessed.

Figure 4:
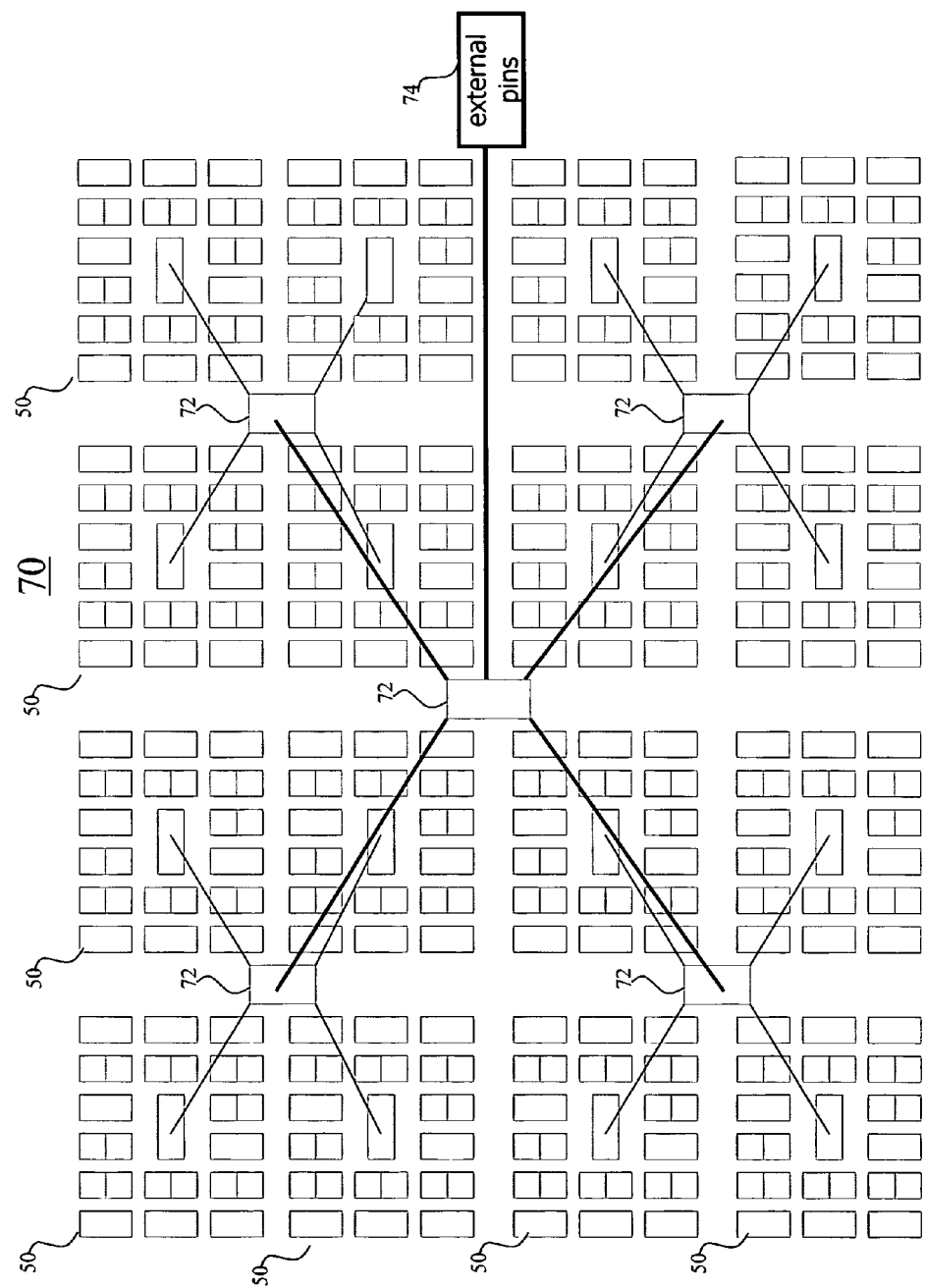
FIG. 4 is a block diagram of a processing system having multiple groups of multiple cores on an integrated circuit in accordance with one embodiment of the invention.

FIG. 4 is a block diagram of a processing system 70 on an integrated circuit in accordance with one embodiment of the invention. This figure illustrates how the structure of figure three is repeatable to increase the number of processing cores. The processing cores 62 are grouped into clusters of, for example, eight processing cores. Sixteen clusters 50 are shown coupled together by common access points 72. Each of these clusters or groups has the same architecture as that shown in figure three. The common access points 72 create a hierarchical or tree structure to the star buses. The central common access point 72 is the highest node in the star bus tree and is coupled to external pins 74 that allow signals to be passed on or off the integrated circuit.

The invention may be used with cores made to execute either a CISC (Complex Instruction Set Computers) instruction set or a RISC (Reduced Instruction Set Computers) instruction set. Generally, a CISC architecture uses about one half the total bytes per unit function compared to a RISC architecture. As a result, a CISC architecture imposes about one half the burden on the memory interface that delivers the code, hence and will be likely to run faster whenever the delivery of code to the core is the limiting factor.

In one embodiment, any of the processing cores 12 or RAMs may be isolated if during testing a defect is found. A processing core may be isolated by a fusable link or under firmware control or other means. This increases the yield of integrated chips using this architecture over monolithic CPUs, since the system 70 is still usable and powerful without all the processing cores 12 being active. As a result, the architecture shown herein is a more cost effective approach to increase the computational power of a processor on a chip.

Figure 5:
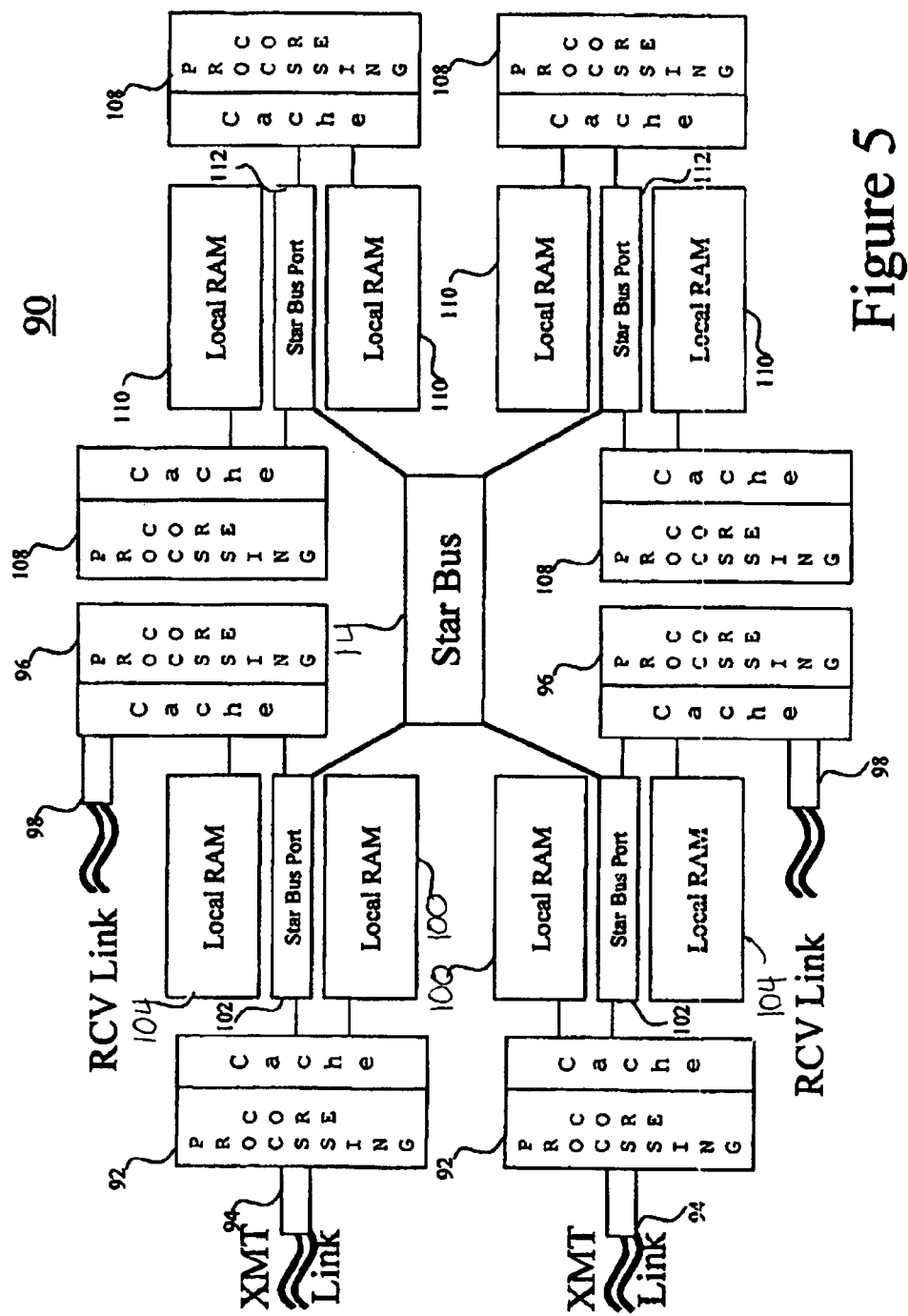
FIG. 5 is a block diagram of a processing system for a switch having a group of cores on an integrated circuit in accordance with one embodiment of the invention.

FIG. 5 is a block diagram of a processing system for a switch 90 on an integrated circuit in accordance with one embodiment of the invention. The figure is similar to the system shown in figure three. The system 90 has a first group of processing cores 92 coupled to a transmit link 94. A second group of processing cores 96 are coupled to a receive link 98. The first group of processing cores 92 are coupled to a local RAM 100 and a common access point 102. The second group of processing cores 96 are coupled to a local RAM 104 and a common access point 102. The common access points 102 are coupled to a central common access point 14. A third group of processing cores 108 are dedicated to overhead tasks associated with the transmit link 94 and receive link 98. The third group of processing cores 108 are coupled to local RAMs 110 and to common access points 112. The first group 92 and second group 96 of processing cores are responsible for the primary task of the switch 90. The third group of processing cores 108 are used for overhead tasks such as, changes in data format, error correction calculations, etc.

Figure 6:
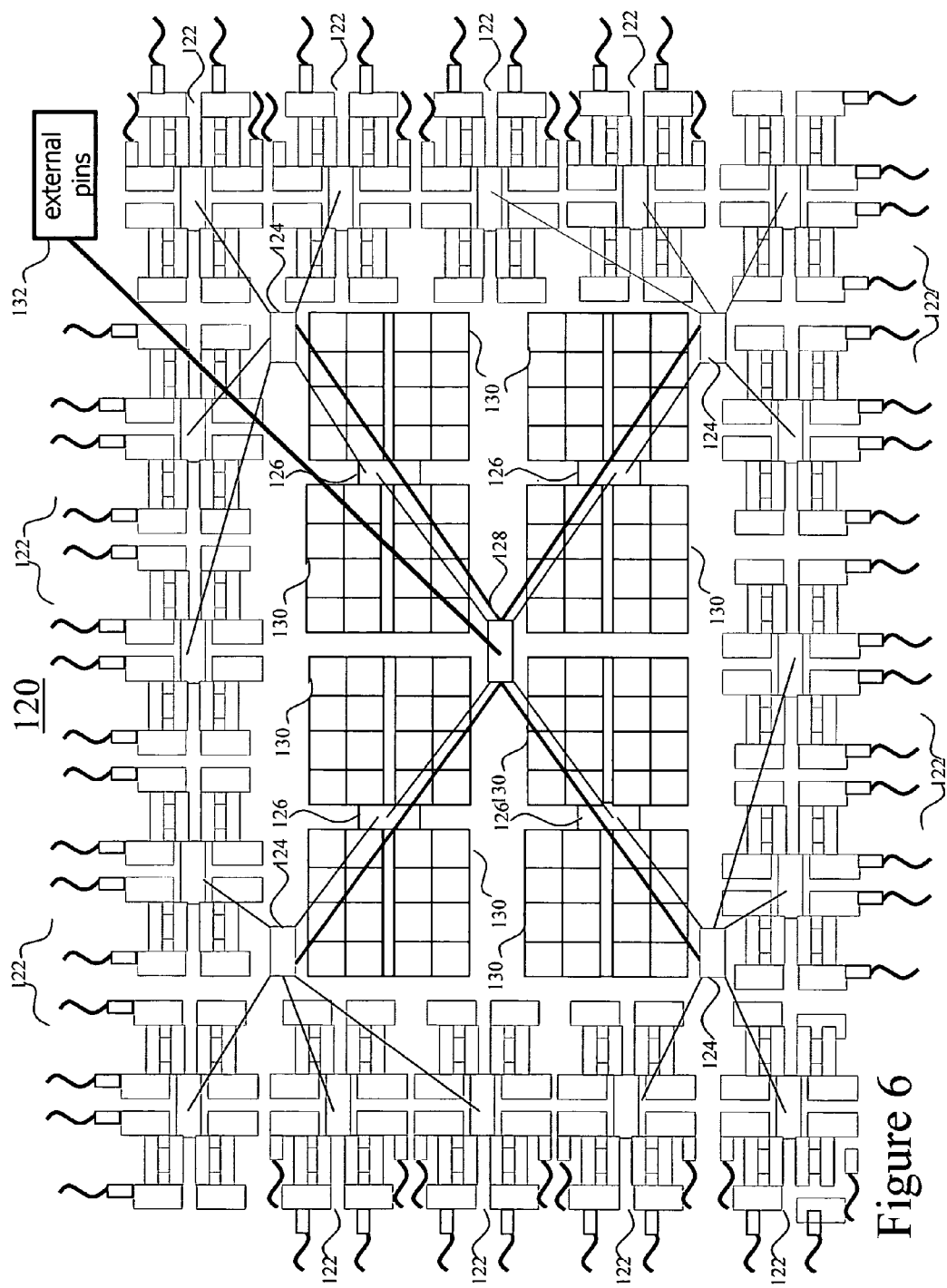
FIG. 6 is a block diagram of a processing system for a switch consisting of multiple groups of multiple cores with a central data memory on an integrated circuit in accordance with one embodiment of the invention.

FIG. 6 is a block diagram of a processing system for a switch 120 on an integrated circuit in accordance with one embodiment of the invention. The system 120 illustrates the embodiment of sixteen clusters 122 that are like the system 90 of FIG. 5. Each of the clusters 120 are coupled to a second tier common access point 124. Each the second tier common access points 124 are coupled to RAM common access points 126 and a third tier common access point 128. Each RAM common access point is coupled to two RAM memory blocks 130 and to the third tier common access point 128. The third tier common access point 128 is coupled to external pins 130 that are used to access and send data off the integrated circuit. The total number of three tiers is not claimed as a required part, but only to illustrate the use of a layering of buses to achieve an optimum means to transport data across the chip between the various clusters and to transport data between any cluster and an off-chip connection.

Thus there has been described a processing system that has significantly more processing power for the same amount of die area than present CPUs. Depending on the application, the processing system of the present invention can process perhaps tens of times the number of instructions using the same die area as present CPUs.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed:

1. A processing system comprising:
   a plurality of processing cores on an integrated circuit coupled together; and
   a plurality of random access memories on the integrated circuit, each of the plurality of random access memories dedicated to one of the plurality of processing cores;
   wherein a first group of the plurality of processing cores is coupled together for direct communication with one another by a first star bus.

2. The system of claim 1, wherein a second group of the plurality of processing cores is coupled together by a second star bus and coupled to the first group of the plurality of processing cores by a third star bus.

3. The system of claim 2, further including a shared random access memory coupled to the second star bus.

4. The system of claim 1, further including a shared random access memory coupled to the first star bus.

5. The system of claim 1, wherein the first star bus comprises a unidirectional bus.

6. The system of claim 1, wherein one of the plurality of processing cores is disabled when it tests defective.

7. The system of claim 6 wherein disabling the processing core includes inactivating the processing core.

8. The system of claim 1, wherein each of the plurality of processing cores further includes a level 0 cache operable to receive data from others of the plurality of processing cores through the first star bus.

9. A processing system, comprising:
   a group of processing cores on an integrated circuit;
   a group of dedicated random access memories on the integrated circuit, each of the dedicated random access memories directly coupled to one of the group of processing cores; and
   a star bus coupling to the group of processing cores configured to provide direct communication between the processing cores.

10. The system of claim 9, further including a shared random access memory coupled to the star bus.

11. The system of claim 10, wherein the shared random access memory comprises interleaved random access memory.

12. The system of claim 9, further including a second group of processing cores coupled to the group of processing cores by a second star bus.

13. The system of claim 12, wherein in the second group of processing cores are coupled together by a third star bus.

14. The system of claim 9, wherein each of the group of processing cores comprises an isolation system.

15. The system of claim 14, wherein each of the group of processing cores comprises an isolation system that may inactivated.

16. The system of claim 9, where in the star bus comprises a unidirectional bus.

17. A processing system, comprising:
   a group of processing cores on an integrated circuit; and
   a star bus coupling the group of processing cores together in direct communication with one another.

18. The system of claim 17, further including a group of dedicated random access memories, each of the dedicated random access memories directly coupled to one of the processing cores.

19. The system of claim 18, further including a shared random access memory coupled to the star bus.

20. The system of claim 19, wherein the shared random access memory comprises interleaved random access memory.

21. The system of claim 20, wherein each of the group of processing cores is fusable.

22. The system of claim 21, wherein fusing a processing core is operable to-inactivate the processing core.

23. The system of claim 17, further including a plurality of groups of processing cores coupled to the first group of processing cores by a second star bus.

* * * * *